July 2, 1957  M. N. FAIRBANK  2,797,625
PHOTOGRAPHIC APPARATUS
Filed Oct. 2, 1953  3 Sheets-Sheet 1
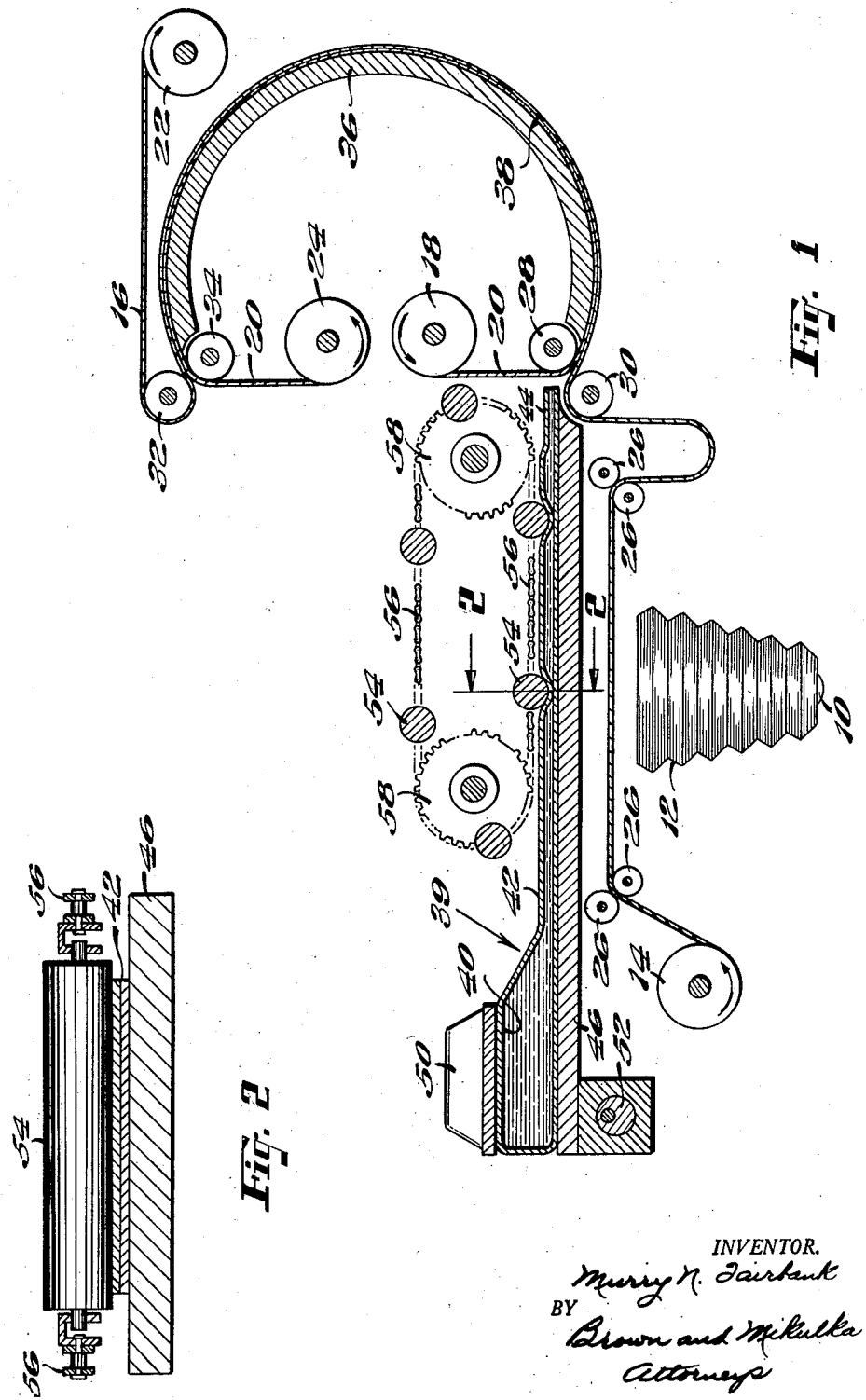
INVENTOR.
Murry N. Fairbank
BY
Brown and Mikulka
Attorneys July 2, 1957 — M. N. FAIRBANK — 2,797,625
PHOTOGRAPHIC APPARATUS
Filed Oct. 2, 1953 — 3 Sheets-Sheet 3

INVENTOR.
Merry N. Fairbank
BY Brown and Mikulka
Attorneys 2,797,625
Patented July 2, 1957

United States Patent Office

2,797,625

PHOTOGRAPHIC APPARATUS

Murry N. Fairbank, Belmont, Mass., assignor to Polaroid Corporation, Cambridge, Mass., a corporation of Delaware Application October 2, 1953, Serial No. 383,715

4 Claims. (Cl. 95—13)

This invention relates to photography and in particular to novel photographic apparatus adapted for processing an exposed photosensitive sheet material. More particularly the present invention relates to photographic apparatus, such as a camera, which is suitable for accomplishing a predetermined processing of an exposed photosensitive sheet by providing on one surface of the exposed photosensitive sheet a thin layer of liquid capable of accomplishing said processing.

It is a principal object of the present invention to provide such an apparatus which is particularly adapted for use with a novel disposable liquid container, said apparatus preferably spreading the liquid between the photosensitive sheet and a second sheet.

Other objects of the invention are: to provide, in an apparatus of the above type, novel means for the positive feeding of a controlled volume of processing liquid to the sheets, said feeding means being particularly adapted for handling processing liquids which are highly viscous and readily oxidized in such a manner that the volume of liquid fed to the sheets may be accurately controlled and the undesired oxidation of the liquid is minimized by allowing only a short period of contact thereof with the air; to provide a novel disposable liquid container particularly adapted for use with said feeding means, said container and feeding means being so constructed and arranged that the processing liquid is confined at all times by the disposable container or the sheets to be processed and does not contact the various elements of the apparatus; and to provide apparatus of the above type adapted for the continuous processing of substantially lengthy sheets of photosensitive material.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a diagrammatic, fragmentary, sectional view of a preferred form of the invention;

Fig. 2 is a sectional view taken along the line 2—2 of Fig. 1;

Figure 3:
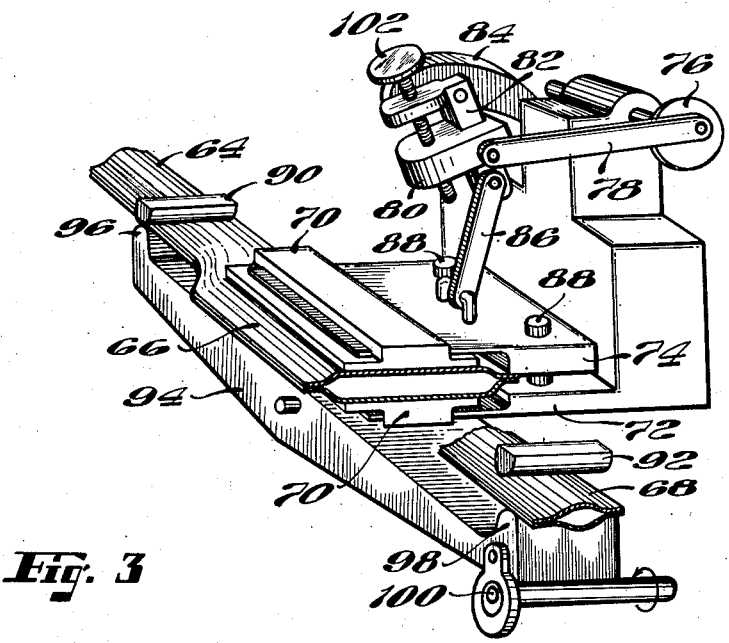
Fig. 3 is a fragmentary, perspective view, partly in section, of another form of liquid-feeding means used in the invention.

In general, the invention comprises a photographic apparatus of the type shown in Patent Nos. 2,558,858, issued July 3, 1951 and 2,563,343, issued August 7, 1951 to Edwin H. Land for Photographic Apparatus, for accomplishing a predetermined processing of a sheet of photosensitive material by providing on said sheet a layer of liquid capable of accomplishing said processing. The apparatus preferably comprises means for positioning a supply of said photosensitive sheet material, means for positioning a supply of a second sheet of material, and means for guiding said sheets from their respective supplies to a position where said sheets are in superposed relation. These guiding and superposing means preferably comprise a pair of surfaces between which and with respect to which the sheets are adapted to move in superposed relation with a liquid-receiving space therebetween. The apparatus also includes means for predeterminedly controlling the thickness of the liquid-receiving space between said sheets so as to predetermine the thickness of the layer of liquid confined between adjacent surfaces of said sheets. There is also provided a means for feeding a predetermined quantity of processing liquid to said sheet materials, said liquid-feeding means being so positioned with respect to the means for superposing the sheets that the liquid does not contact said superposing means. The liquid-feeding means includes a novel disposable container having therein a quantity of the processing liquid preferably sufficient to accomplish the processing of a complete roll of photographic sheet material. This disposable container preferably includes an elongated tubular neck secured to a main body portion of the container with a nozzle portion extending from the tubular neck. Means are provided for forcing a predetermined volume of processing liquid to be discharged from said container through said nozzle, said container and said neck being adapted to this purpose and so constructed that the liquid processing composition is confined at all times by either the disposable container or the sheets to be processed and does not contact the various other elements of the apparatus. Means are also provided for supporting said container and said nozzle from which the processing liquid is discharged so that said liquid is discharged into said liquid-receiving space.

In a preferred form of the invention the superposing means is so arranged that after the sheets converge into superposition, they provide a V-shaped liquid-holding space converging to an apex communicating with the liquid-receiving space between the surfaces of the sheets. The nozzle discharges the liquid directly into said liquid-holding space wherein it is held until withdrawn by the sheets defining and passing by this space. The volume rate of flow of liquid from the nozzle is preferably adjusted with respect to the lineal rate of movement of the sheets so that at all times the quantity of liquid in the liquid-holding space is the minimum sufficient to deposit a layer of the desired thickness between the sheets. Thus, the liquid fed from the nozzle is used up almost immediately and is thereby subject to only negligible oxidation prior to inclusion between the two sheets.

There is provided, in a preferred form of the invention, means for exposing the photosensitive sheet and for processing the exposed sheet by superposing it on a second sheet and spreading a thin layer of processing liquid between the two sheets. By way of example, the photosensitive sheet includes a silver halide layer and the second sheet includes a silver precipitating layer. The processing liquid may include a developer, a silver halide solvent and an alkali and is preferably quite viscous. When a layer of this processing liquid is spread between the photosensitive sheet and the second sheet, a latent image in the photosensitive sheet is developed into silver and a silver complex is formed from undeveloped silver halide and transferred by imbibition to the second sheet where it is developed to silver to produce a positive image. The imbibition time required for this processing may range anywhere from five seconds to somewhat more than one minute, depending on the constituents of the processing liquid, the type of photographic emulsion and the temperature of the materials. At the end of the processing period, the sheets are preferably separated by suitable means and separately coiled.

Referring now to drawings, wherein like numerals denote like parts, there is shown in Fig. 1 a diagrammatic view of one preferred form of apparatus embodying the present invention, this apparatus being illustrated as a photocopy camera. The apparatus comprises a housing (not shown) carrying a lens and shutter assembly schematically indicated at 10 and supported by bellows 12. Means are provided for positioning supplies of the photosensitive sheet and a second sheet, said means preferably comprising a spool 14 of conventional design, on which is coiled a photosensitive sheet 16, and spool 18 on which is coiled a roll of a second sheet 20. As means for coiling the sheets after processing, there is provided spool 22, on which is coiled processed photosensitive sheet 16, and spool 24 on which is coiled second sheet 20. Means are provided for positioning photosensitive sheet 16 in the focal plane of lens 10 for exposure of the sheet, this means comprising by way of example, two pairs of rolls 26 between which the sheet is advanced and held in position for exposure. In the form shown, either or both pairs of rolls 26 may be driven and the sheet may either be advanced intermittently for exposure of separate frames thereof or may be advanced continuously.

As a means for feeding and guiding exposed photosensitive sheet 16 into superposition with second sheet 20 there is preferably provided a pair of pressure-applying rolls 28 and 30 so positioned that as the sheets pass between them in face-to-face relation there exists a liquid-receiving space therebetween. This liquid-receiving space may be created by providing a space between the two rolls slightly greater than the combined thickness of the two sheets. In another form of the invention, the two rolls may be resiliently urged towards one another so that the space may not exist in a static condition of the rolls, but may be created by the pressure of the viscous processing liquid passing between the sheets causing separation of the rolls or of the resilient surfaces thereof.

Means are provided for separating the processed photosensitive sheet from the second sheet at a predetermined point, this means comprising a pair of rolls 32 and 34 between which the superposed sheets are advanced. The distance between the superposing means and the point of separation of the superposed sheets is dependent upon the lineal rate of advancement of the sheets and the time required for processing, it being desirable to separate the sheets at the moment when processing is completed. It is apparent that the use of materials requiring a relatively long processing time would require that the sheets either be advanced at a comparatively slow lineal speed or that the distance between the superposing means and the point of separation of the sheets be of considerable magnitude.

When materials used are of the type requiring short processing time, or when the length of their path during processing, as well as the size of the apparatus is not a critical factor, it is desirable that means be provided for advancing the superposed sheets along a straight path during processing. However, in order to permit rapid lineal speeds and to avoid the necessity for a substantially bulky apparatus, there is provided, in the preferred form of the invention, means for advancing and processing these sheets in a curved path. This means comprises an arcuate support member 36 defining a curved surface 38 of uniform diameter against and around which the sheets are drawn during imbibition. Curved surface 38 extends from a point adjacent roll 28 to a point adjacent roll 34, and the plane of the axes of rolls 28 and 30 is so positioned with respect to surface 38 that the superposed sheets passing between said rolls assume a curved configuration without relative movement between superposed surfaces thereof. The uniformity of the diameter of surface 38 is critical inasmuch as any variation therein may cause a movement of the surface of one sheet with respect to the surface of the other sheet on which it is superposed, resulting in disruption of the process. Means (not shown) are provided for heating member 36 to raise the temperature of the sheets, thereby increasing their processing rate and permitting both an increase in the rate of movement of the sheets through the apparatus and a decrease in the actual distance between the point of superposition and the point of separation of the sheets.

The novel container 39 of the invention, generally indicated at 39, comprises a main body or reservoir portion 40 and an elongated tubular neck 42 ending in a nozzle portion 44. The container body and neck are formed of come flexible sheet material which is alkali inert and compatible with the processing liquid to be used and, by way of example, may be of some suitable plastic such as plasticized ethyl cellulose, methyl methacrylate, polyvinyl butyrate, polyvinyl chloride and polyvinylidene chloride polymers, while nozzle 44 may be formed of a relatively rigid, alkali-inert plastic such as ethyl cellulose or methyl methacrylate. The container may be assembled in any suitable manner such as by heat-sealing the edges of plastic sheet material to form seams and may be of sufficient size to hold a predetermined volume of processing liquid, as for example, the volume of liquid sufficient to process one roll of a photosensitive sheet. The container is supported on plate 46 with neck 42 being supported so that nozzle 44 extends into the liquid-holding space between the two sheets.

Because the processing liquid may be highly viscous, the apparatus includes means for causing the liquid to be forced from body portion 40 wherein it is contained into neck 42, said neck in turn comprising one element of means for forcibly feeding a controlled quantity of processing liquid to the superposed sheets. The first-mentioned means may include a weighted plate 50 adapted to rest on container body portion 40, creating a hydraulic pressure in the liquid contained therein and thereby forcing said liquid into neck 42. While the container 39 of the invention is illustrated as being supported in a horizontal position, it is to be understood that the container may be held in an inclined or vertical position. Inasmuch as the viscous liquid may be of a thixotropic nature, suitable means may be provided for agitating the liquid to make it flow more freely. Suitable vibrating means, such as an eccentric 52, may be provided for agitating the thixotropic viscous processing liquid to flow more freely when subjected to hydraulic pressure, as shown in the present embodiment, or, in another form of the invention, cause it to flow due to gravitational force from a container held in a vertical position.

Means are provided for feeding a predetermined volume of processing liquid at a controlled rate, this means comprising a plurality of rollers 54 adapted to successively engage longitudinal portions of the deformable neck 42 to press together the walls thereof and squeeze the processing liquid in the desired direction. A predetermined quantity of liquid may be trapped in a portion of the neck between two of said rollers and advanced at a controlled speed so that the liquid is fed to the superposed sheets at the desired volume rate. In the form shown, a plurality of rollers 54 are rotatably mounted at their ends on a pair of parallel drive chains 56 supported on and driven by sprockets 58 mounted in a fixed relation to channel support 48 so that the axes of rollers 54 move during a portion of their travel in a plane parallel to the surface of support 48. The rollers are uniformly spaced along the drive chains in such a manner that at every moment there are at least two of said rollers in engagement with said neck. In operation, sprockets 58 and chains 56 are rotated in a counterclockwise direction, as viewed in Fig. 1, and rollers 54 are caused to engage the walls of neck 42 and press the latter together when moving from left to right. A predetermined volume of processing liquid is trapped in the neck between a pair of said rollers and is propelled toward nozzle 44 at a controlled rate until disengagement of the leading roller from the neck permits the liquid to be forced through said nozzle by the action of the following roller on the neck. Variation in the volume rate of flow of the processing liquid may be effected by varying either the cross-sectional area of the neck or the speed of rotation of the sprockets. The length of the nozzle 44, or the distance between the point of disengagement of the rollers and the discharge point, should be kept at a minimum to insure substantially continuous discharge of the processing liquid from said nozzle. Because feeding of the processing liquid is not dependent on hydraulic pressure created therein, which pressure may vary substantially from point to point in a viscous liquid, but is effected by advancing a predetermined volume of liquid through a deformable tube, an accurately controlled and substantially continuous discharge of a predetermined volume of processing liquid is assured.

Figure 4:
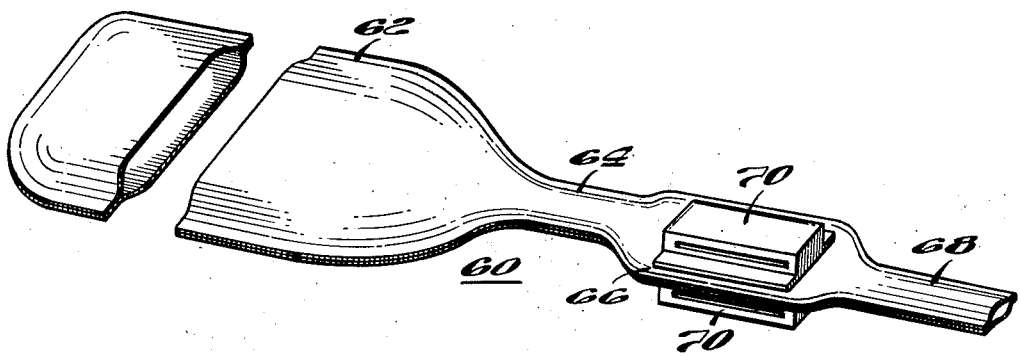
Fig. 4 is a perspective view showing in detail a disposable container comprising the liquid-feeding means of Fig. 3.

Referring now to Figs. 3 and 4, there is shown another embodiment of means for the continuous controlled feeding of the viscous processing liquid used in the invention. There is provided a flexible container 60 formed of a suitable material inert to the processing liquid and having a body or reservoir portion 62 and an elongated neck having a tubular inlet section 64 adjacent said body expanding into a pump section 66 and again narrowing into a tubular discharge section 68 open at one end through which the processing liquid is discharged. A pair of stiffeners 70 adapted to engage portions of a pump means are bonded or suitably secured, as by heat-sealing, to the outside surfaces of opposite walls of said pump section 66 of the container neck. In order to propel the processing liquid through the container neck, there is provided apparatus adapted to engage stiffeners so as to alternately compress and expand pump section 66. This apparatus comprises a fixed plate 72 adapted to engage one of said stiffeners 70 affixed to pump section 66, another plate 74 adapted to engage the other of said stiffeners and means for moving plate 74 toward or away from plate 72 so as to alternately compress and expand pump section 66, said last-named means comprising crank 76, driven by suitable drive means, and connecting rod 78 pivotally secured to slider 80 on link arm 82, the latter being pivotally mounted at one end on support 84 and connected at its other end with link arm 86 pivotally connected to plate 74. Pins 88, mounted on plate 72 and extending through suitable holes in plate 74, may be provided for positioning plate 74 with respect to plate 72. Means are also provided for alternately squeezing inlet section 64 and discharge section 68 in concert with the alternate expansion and compression of pump section 66, said means comprising fixed members 90 and 92 positioned respectively adjacent inlet section 64 and discharge section 68, and arm 94 pivotally mounted intermediate its ends and having end portions 96 and 98 adapted to cooperate respectively with fixed members 90 and 92 to alternately squeeze inlet section 64 and discharge section 68. An eccentric, generally indicated at 100 and coupled with means driving the crank and connecting rod, is provided so as to cause arm 94 to pivot alternately in a clockwise and counterclockwise direction. In operation, rotation of eccentric 100 causes arm 94 to pivot in a clockwise direction, pinching discharge section 68 at the same time plate 74 moves away from plate 72 so as to expand pump section 66, thus drawing processing liquid into said section. The continued rotation of eccentric 100 then causes arm 94 to pivot in a clockwise direction, releasing discharge section 68 and pinching inlet section 64 at the same time plate 74 moves toward plate 72 to compress pump section 66 and discharge the processing liquid contained therein.

Plates 72 and 74 are so positioned with respect to one another that, at the end of each compression or discharge stroke, pump section 66 is compressed so that the liquid contained therein is discharged completely. In order to vary the volume of processing liquid discharged by the apparatus, there is provided a screw 102, coupled with link arm 82 and slider 80, to position said slider so that the length of the expansion or intake stroke of plate 74 may be increased or decreased. The discharge rate may also be varied by changing the timing of arm 94 with respect to the stroke of plate 74 or by varying the speed of the driving means.

In one form of the invention, suitable means may be provided for reciprocating the discharge end of the neck across the sheets as they are superposed, thereby insuring a more even spreading of the processing liquid in the liquid-holding space. The action of the reciprocating means may be so coordinated with the feeding means that a quantity of liquid is discharged in the liquid-holding space during one movement of the discharge end across the sheets and the intake stroke of the feeding means occurs during the return movement of the discharge end. It is to be understood that the container and feeding means may be operated effectively in any desired position and the container so positioned that gravity will aid in forcing the processing liquid from the reservoir section into the pump section of the container. Means may also be provided for creating an hydraulic pressure in the processing liquid in the reservoir section of the container to aid in forcing said liquid into said pump section.

Figure 5:
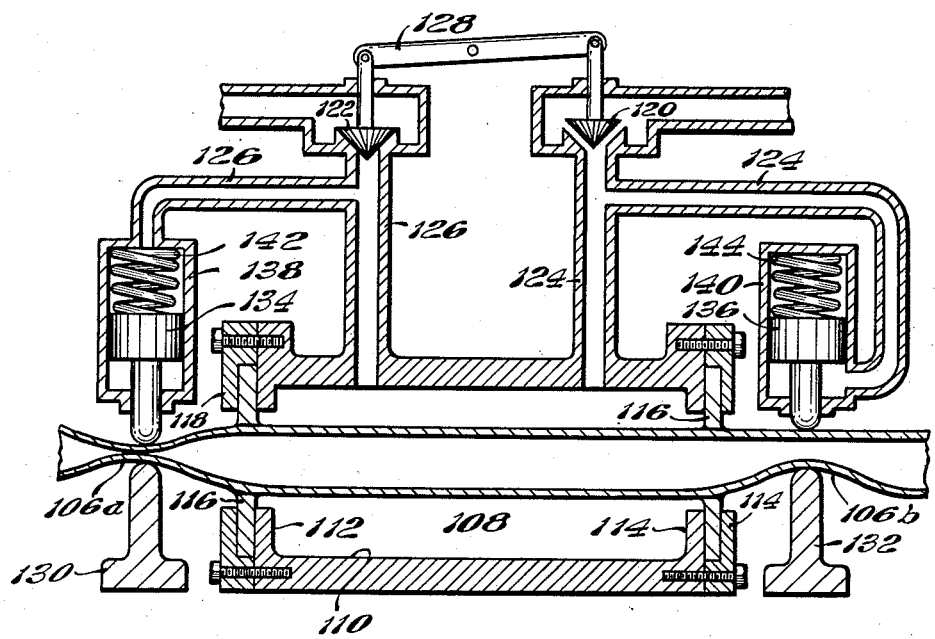
Fig. 5 is a diagrammatic, fragmentary, sectional view of still another form of liquid-feeding means.
Figure 6:
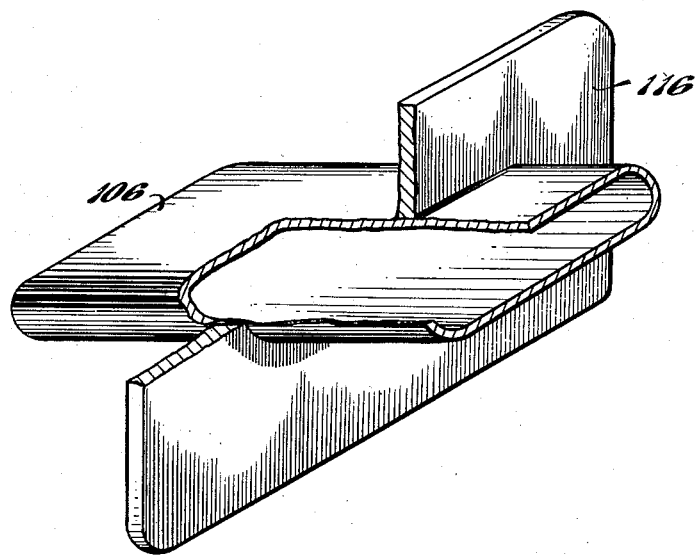
Fig. 6 is a fragmentary, perspective view, partly in section, of a sealing flange of the feeding means of Fig. 5.

Referring now to Figs. 5 and 6, there is illustrated still another liquid-feeding means particularly adapted for use with a disposable container and in which the liquid is confined at all times to contact with said disposable container. The feeding means comprises a flexible container 104 having an elongated tubular neck 106, and a preferably cylindrical, hermetically sealable compression chamber generally indicated at 108 and defined by wall 110 and end walls 112 and 114, said neck extending through openings in end walls 112 and 114 of said chamber. A pair of sealing flanges 116, formed as shown of some suitable rigid material, are secured to the exterior of neck 106, said flanges being adapted to cooperate with clamp portions 118 of end walls 112 and 114 to seal the chamber when neck 106 is inserted therethrough. Pneumatic means are provided for alternately compressing or collapsing and expanding the portion of neck 106 within the chamber, while at the same time alternately pinching inlet portion 106a and discharge portion 106b of neck 106 extending respectively from and adjacent to ends 112 and 114 of said chamber. In the form shown, this means comprises valves 120 and 122 connected respectively by conduits 124 and 126 with compression chamber 108 and operated by arm 128 pivoted at its center, valve 120 being connected to a supply of compressed air and valve 122 being connected with a suitable suction-producing means, as for example, a vacuum pump. Valves 120 and 122 act to alternately admit and exhaust air to and from compression chamber 108, thereby alternately compressing and expanding neck 106. Fixed members 130 and 132 are mounted respectively adjacent ends 112 and 114 of the chamber and are adapted to cooperate with pistons 134 and 136 to pinch discharge and inlet portions of neck 106 extending through said ends of said chamber. Pistons 134 and 136 in cylinders 138 and 140 are normally urged towards members 130 and 132 by springs 142 and 144 in said cylinders so as to pinch the neck. Valves 122 and 120 are connected respectively by conduits 126 and 124 with cylinders 138 and 140 so that when valve 120 is opened and valve 122 closed, piston 134 acts to pinch intake portion 106a of neck 106, piston 136 releases discharge portion 106b of neck 106 and the processing liquid contained in the portion of the neck within chamber 108 is forced out of said portion when the neck is compressed. Valve 120 is then closed and valve 122 opened, causing piston 136 to pinch the discharge portion 106b of neck 106, piston 134 to release inlet portion 106a of neck 106, and the portion of the neck within the container to be expanded, thereby taking in a quantity of processing liquid for discharge therefrom when the process is repeated. It may be noted that either air pressure or suction acts in cooperation with each of the pistons to effectively and securely pinch the portion of the neck associated therewith.

Suitable drive means may be provided for pivoting arm 128 to alternately open and close valves 120 and 122, variation in the speed of said means pivoting arm 128 being effective to vary the volume rate of discharge of the processing liquid. Variation in the volume rate of flow of the liquid may also be effected by throttling either or both valves. Although the embodiments of the invention show means pinching the deformable neck to be mechanically or pneumatically operated, it is to be understood that various combinations of these and other methods such as solenoids may be used without departing from the scope of the invention.

In the form of the invention shown, spools 14, 18, 22 and 24 and all the various rolls, with the exception of either one of superposing rolls 28 and 30, are suitably driven such as by means of a hand crank, electric or spring motor, or by other arrangements. It is equally possible to drive only take-up spools 22 and 24 or to drive rolls 32 and 34, the movement of the sheets moving rolls 28 and 30, or, further still, drive both superposing rolls 28 and 30.

While a preferred superposing means has been shown as comprising a pair of rolls, there may be provided other superposing surfaces such as curved plates, a roll and a plate, or bars which are nonrotatable. Each of the guiding, propelling, superposing, and spreading functions of the rolls may be performed by separate means. Equally, the plane of superposition of the two sheets may be varied from curved to flat where the bulk or length of the apparatus is not critical. It can, for example, be horizontal or vertical and can extend upward to a certain extent in those cases where the liquid has exceptionally high viscosity to be carried upward on one of the sheets after application to the sheet.

In various forms of the invention, various portions of the device may be suitably hinged or removably mounted to facilitate loading thereof and suitable light-seals are provided, where necessary, to prevent fogging of the photosensitive materials employed.

While a preferred use of the apparatus has been described above wherein the processing liquid is spread between the surface of the photosensitive sheet and a second surface moving at the same rate of speed as the photosensitive surface, other uses thereof are feasible in those cases where the photosensitive sheet is the only sheet passing between the rolls 28 and 30, and the liquid need only be spread in contact with the photosensitive sheet. In order that the apparatus may be so used, roll 28 has a surface to which the processing liquid does not readily adhere and which is inert to said liquid. This surface may be polished stainless steel or an alkali-inert plastic. In this case the rolls are spaced a sufficient distance apart so that a liquid-receiving space exists between the surface of photosensitive sheet 16 and roll 28. The liquid is fed or carried into the liquid-holding space defined on the one hand by the surface of the photosensitive sheet and on the other hand by roll 28. After the photosensitive sheet passes by this liquid-holding space, a thin layer of the liquid is applied to the surface thereof and the layer of liquid adheres to or is absorbed by the photosensitive sheet and accomplishes the desired processing. If desired, the apparatus may be modified for such alternative use by providing a drum or belt being preferably moved at the same rate of speed as the photosensitive sheet.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. In photographic apparatus for processing an elongated strip of exposed photosensitive material wherein successive surface portions of said strip are continuously brought into superposed relation with a second surface with a fluid-receiving space therebetween, in combination, means for substantially continuously supplying a viscous fluid processing composition at a controlled rate into said space and maintaining said fluid composition out of contact with the atmosphere until it is deposited within said space, said means comprising a container formed of a flexible sheet material, said container including a body section containing a quantity of said fluid and an integral elongated neck ending in a mouth located in close proximity to said fluid-receiving space, means supporting said container with said mouth so positioned as to direct said fluid into said space, means for vibrating said container-supporting means for agitating the fluid contents of said container when said viscous processing fluid is thixotropic, means engaging said body section of said container for creating hydraulic pressure within the fluid within said body section to force said fluid into said elongated neck, means for engaging the exterior of said neck at spaced-apart portions of said neck and compressing said portions of said neck so as to isolate a predetermined quantity of said fluid therein, and means engaging the exterior of said neck between said spaced-apart portions for compressing the portions of said neck containing said isolated quantity of said fluid for impelling said quantity of fluid to flow at a controlled rate through said neck and from said mouth into said fluid-receiving space.

2. In photographic apparatus for processing an elongated strip of exposed photosensitive sheet material and including means for continuously superposing successive surface portions of said strip with a second strip with a fluid-receiving space therebetween, said means providing a pair of surfaces between which and with respect to which said strips are moved in superposed relation with said fluid-receiving space therebetween, in combination, means for substantially continuously supplying a viscous fluid processing composition at a controlled rate into said space and maintaining said fluid out of contact with the atmosphere until it is deposited within said space, said means comprising a container formed of a flexible sheet material, said container including a body section containing a quantity of said fluid and an integral elongated neck ending in a discharge mouth located in close proximity to said fluid-receiving space, means for supporting said container with said mouth positioned so as to direct said fluid into said space, means for engaging and deforming said body section of said container for creating hydraulic pressure within the fluid in said body section to force said fluid into said elongated neck, said neck including a first section adjacent said body section, an intermediate section and an end section adjacent said discharge mouth, means for engaging the exterior of said neck at said first and end sections for pinching the last-mentioned sections so as to isolate a predetermined quantity of said fluid in said intermediate section, a pair of rigid members having substantially flat parallel opposed surfaces, said rigid members being secured at said surfaces to opposite sides of said intermediate section, and means for reciprocating said rigid members away from and toward one another for alternately expanding and compressing said intermediate section of said neck for alternately drawing a quantity of said fluid into said intermediate section where said quantity of said fluid is isolated and discharging the isolated quantity of said fluid from said mouth into said fluid-receiving space, the last-mentioned means including a fixed element releasably interlocked with one of said rigid members and an element movable with respect to said fixed element and releasably interlocked with the other of said rigid members, crank means for reciprocating said movable element with respect to said fixed element, and means for varying the extent of movement of said movable member away from said fixed element and thereby varying the rate of flow of said fluid discharged from said mouth.

3. In photographic apparatus for processing an elongated strip of exposed photosensitive sheet material and including means for continuously superposing successive surface portions of said strip with a second strip with a fluid-receiving space therebetween, said means providing a pair of surfaces between which and with respect to which said strips are moved in superposed relation with said fluid-receiving space therebetween, in combination, means for substantially continuously supplying a viscous fluid processing composition at a controlled rate into said space and maintaining said fluid out of contact with the atmosphere until it is deposited within said space, said means comprising a container formed of a flexible sheet material, said container including a body section containing a quantity of said fluid and an integral elongated neck ending in a discharge mouth located in close proximity to said fluid-receiving space, means for supporting said container with said mouth positioned so as to direct said fluid into said space, means for engaging and deforming said body section of said container for creating hydraulic pressure within the fluid in said body section to force said fluid into said elongated neck, said neck including a first section adjacent said body section, an intermediate section and an end section adjacent said discharge mouth, means for engaging the exterior of said neck at said first and end sections for pinching the last-mentioned sections so as to isolate a predetermined quantity of said fluid in said intermediate section, said last-mentioned means including a first fixed member in engagement with said first section, a second fixed member in engagement with said end section, an arm member having end portions located in juxtaposition with said fixed members and capable of cooperating therewith for pinching said sections of said neck engaged therebetween, and means for pivoting said arm member intermediate said end portions so that said end portions alternately engage and pinch said first and end sections of said neck against said fixed members, a pair of rigid members having substantially flat parallel opposed surfaces, said rigid members being secured at said surfaces to opposite sides of said intermediate section, and means for reciprocating said rigid members away from and toward one another for alternately expanding and compressing said intermediate section of said neck for alternately drawing a quantity of said fluid into said intermediate section where said quantity of said fluid is isolated and discharging the isolated quantity of said fluid from said mouth into said fluid-receiving space, the last-mentioned means including a fixed element releasably interlocked with one of said rigid members and an element movable with respect to said fixed element and releasably interlocked with the other of said rigid members, and crank means for reciprocating said movable element with respect to said fixed element.

4. In photographic apparatus for processing an elongated strip of exposed photosensitive sheet material and including means for continuously superposing successive surface portions of said strip with a second strip with a fluid-receiving space therebetween, said means providing a pair of surfaces between which and with respect to which said strips are moved in superposed relation with said fluid-receiving space therebetween, in combination, means for substantially continuously supplying a viscous fluid processing composition at a controlled rate into said space and maintaining said fluid out of contact with the atmosphere until it is deposited within said space, said means comprising a container formed of a flexible sheet material, said container including a body section containing a quantity of said fluid and an integral elongated neck ending in a discharge mouth located in close proximity to said fluid-receiving space, means for supporting said container with said mouth positioned so as to direct said fluid into said space, means for engaging and deforming said body section of said container for creating hydraulic pressure within the fluid in said body section to force said fluid into said elongated neck, said neck including a first section adjacent said body section, an intermediate section and an end section adjacent said discharge mouth, means for engaging the exterior of said neck at said first and end sections for pinching the last-mentioned sections so as to isolate a predetermined quantity of said fluid in said intermediate section, a pair of rigid members having substantially flat parallel opposed surfaces, said rigid members being secured at said surfaces to opposite sides of said intermediate section, and means for reciprocating said rigid members away from and toward one another for alternately expanding and compressing said intermediate section of said neck for alternately drawing a quantity of said fluid into said intermediate section where said quantity of said fluid is isolated and discharging the isolated quantity of said fluid from said mouth into said fluid-receiving space, the last-mentioned means comprising a first link arm pivotally secured at one end to a fixed support, a second link arm pivotally secured at one end to said movable element and at its other end to said first link arm, a pivot member slidably mounted on said first link arm, means for varying the position of said pivot member on said first link arm, and a crank arm pivotally connected to said pivot arm for pivoting said first link arm to effect the reciprocation of said movable element with respect to said fixed element.

References Cited in the file of this patent

UNITED STATES PATENTS

| | | |
|---|---|---|
| 2,104,283 | Webster | Jan. 4, 1938 |
| 2,281,094 | Chambers | Apr. 28, 1942 |
| 2,520,641 | Land | Aug. 29, 1950 |
| 2,558,858 | Land | July 3, 1951 |
| 2,647,661 | Harvey | Aug. 4, 1953 |
| 2,668,637 | Gilmore | Feb. 9, 1954 |